INVENTOR.
ALAN C. HURKAMP
ATTORNEY

United States Patent Office 3,430,047
Patented Feb. 25, 1969

1

3,430,047
BACKGROUND CANCELLING OPTICAL
DETECTION SYSTEM
Alan C. Hurkamp, Brookline, Mass., assignor to Sanders Associates, Inc., Nashua, N.H., a corporation of Delaware
Filed Jan. 4, 1965, Ser. No. 423,282
U.S. Cl. 250—199
Int. Cl. H04b 9/00, 1/10; H01j 39/12
11 Claims

ABSTRACT OF THE DISCLOSURE

A background cancelling optical detection system is provided wherein a first optical detector intercepts a target signal together with whatever background radiation is present and a second optical detector intercepts only the background radiation. The output signal of the second detector is subtracted from that of the first detector to thereby effectively cancel out the background radiation signal.

---

Figure 1:
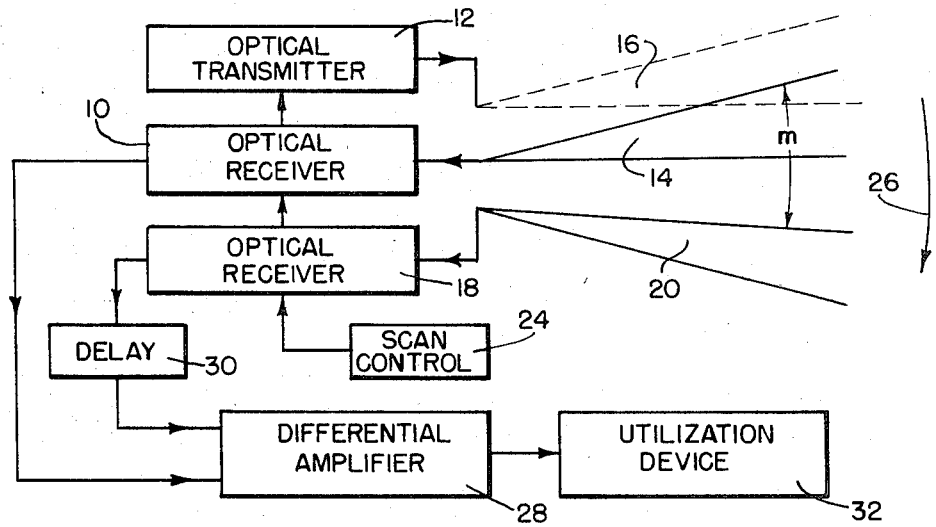

The invention herein described was made in the course of a contract with the Department of the Army.

This invention relates to apparatus for cancelling background radiation intercepted by an optical detector.

More particularly, the invention employs a first optical detector that intercepts a target signal together with whatever background radiation is present. A second optical detector intercepts the same background interference but none of the target signal. The output signal from the second detector is then subtracted from the output signal from the first detector and the background components of the two signals substantially cancel each other in the subtracting device. Hence, the resultant signal corresponds primarily to the radiation intercepted from the target.

The background radiation which an optical detector intercepts from noise sources such as the sun and jamming devices adversely affects the minimum target signal that a receiving system can discern. Hence, unless the background radiation is somehow suppressed, it limits the effective range of optical receiving systems.

Prior optical receiving systems often employ a narrow band optical filter to limit the accepted radiation to a narrow spectrum coextensive with the frequency of the desired target. This technique, however, does not remove the background radiation within the target spectrum. Also, where the filter spectrum is narrower than the spectrum of a relatively broad spectrum target, a substantial part of the target signal may be lost.

Another prior art technique used in an active system reduces the amount of intercepted background radiation by illuminating a narrow spatial field of view and correspondingly by limiting the field of view of the detector. However, where the optical detector scans the target area, this technique reduces the time during which the target is in the detector's field of view and hence reduces the average amplitude of the intercepted target signal. Also, this technique increases the scan modulation frequency.

The principal shortcoming of apparatus embodying such prior methods is that the output signal still includes a substantial component due to background radiation.

Accordingly, it is an object of the present invention to provide an optical receiving system characterized by an improved low response to background radiation.

A further object of the invention is to provide apparatus

2 for materially cancelling background radiation intercepted by an optical detector. A more particular object is to provide such interference-cancelling with minimal loss of the target signal.

Another object of the invention is to provide optical detecting apparatus having an improved low response to background radiation and which can be combined with prior art equipment having the same purpose.

It is also an object of the invention to provide an optical detecting system of the above character that can be implemented with existing equipment.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

Figure 2:
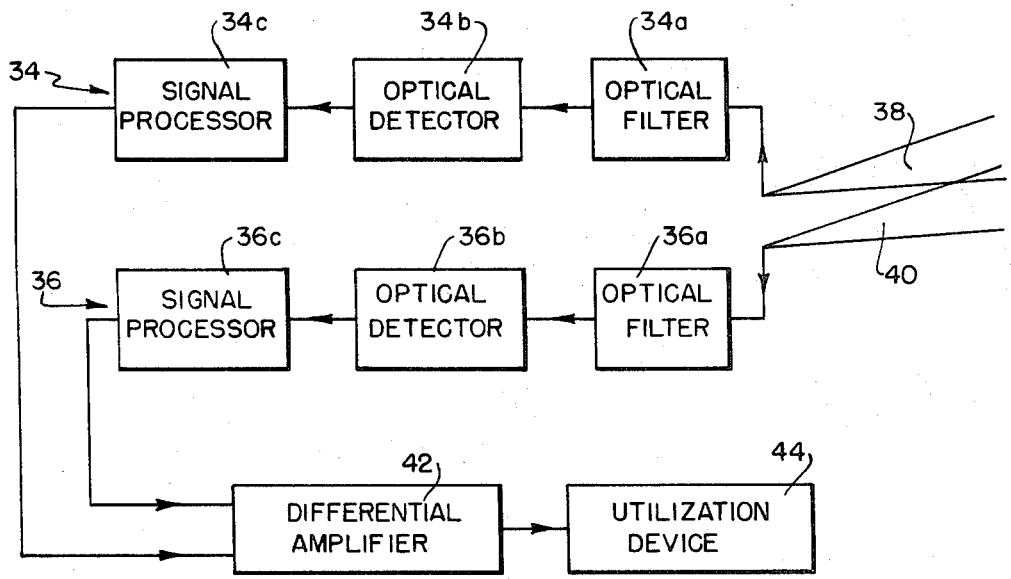

For a fuller understanding of the nature and objects of the invention, reference should be had to the following detailed description taken in connection with the accompanying drawings, in which:

FIG. 1 is a block schematic diagram of an optical receiving system embodying the invention; and FIG. 2 is a block schematic diagram of another optical receiving system embodying the invention.

In general, the present optical receiving system has a first receiver that intercepts target signals as well as background radiation present in its field of view.

As used herein, the term "field of view" includes not only "spatial field of view," which refers to the area or solid angle a receiver or transmitter illuminates, but also "spectral field of view." This latter term identifies the frequency range of the radiation to which a receiver responds.

An identical second receiver intercepts essentially the same background radiation but has a different spectral or spatial field of view so that it does not receive the signal from the target. A differential circuit, such as a differential amplifier, receives the output signals from the two receivers and subtracts the second receiver signal from the first receiver signal. Inasmuch as the two receivers intercept essentially the same background radiation, the differential circuit cancels this portion of their output signals and its output signal is therefore primarily responsive to the target signal intercepted by the first receiver.

As illustrated below, the invention can be employed in an active receiving system, where the target signal is an echo of a transmitted signal, as well as in a passive system where the target signal results from other radiation emitted and reflected from the target. Moreover, the invention can be used with optical receiving systems employing the prior art techniques discussed above.

More specifically, FIG. 1 shows an optical receiving system having a first optical receiver 10 and an optical transmitter 12. The transmitter can, for example, employ a maser-type optical source. The first receiver 10 and the transmitter 12 have spatial fields of view as indicated with the respective beams 14 and 16.

The transmitter 12 illustratively transmits optical energy in a succession of pulses. In the interval between successive pulses, the receiver 10 intercepts echoes of the transmitted energy reflected from objects within its beam 14. The receiver 10 also intercepts background radiation within its beam 14. The receiver develops a video output signal corresponding to the amplitude variations in the optical radiation it intercepts. The signal comprises an echo component superimposed on a background component.

The receiving system also has a second optical receiver 18, which may be identical to the receiver 10. The spatial field of view of the receiver 18, indicated with the beam 20, is preferably identical to the beam 14 but offset from it by an angle ($m$). The beams 14 and 20 are identical so that both receivers "see" the same sources of background radiation and no others.

A scan control unit 24 is connected with the transmitter 12 and with the receivers 10 and 18 to sweep the beams 14, 16 and 20 at the same rate and in synchronism with each other in the direction indicated by the arrow 26. With this arrangement, the beam 20 of the receiver 18 leads the beams 14 and 16 of the receiver 10 and transmitter 12.

The angle ($m$) and the scan rate are selected so that essentially no reflected energy from the transmitter 12 falls within the spatial field of view of the second receiver 18. Thus, the receiver 18 develops a video output signal responsive only to the background radiation it intercepts.

As also shown in FIG. 1, the output signal from the first receiver 10 is fed directly to a differential amplifier 28 and the output signal from the second receiver 18 is applied through a delay circuit 30 to another input terminal of the amplifier 28. The delay circuit 30 introduces a delay time equal to the duration between the time the beam 20 first intercepts an area in space to the time the beam 14 intercepts the same area. Thus, the instantaneous values of the two signals input to the differential amplifier 28 correspond to the radiation the two receivers intercept from the same space location. The receiver 18, however, receives radiation that arrived prior to the arrival of radiation the receiver 10 has intercepted from the same points in space.

In most instances, the background radiation present in the atmosphere changes by a relatively negligible amount during the small time between when the receiver 18 scans a space location and when the receiver 10 scans the same location. Hence the background radiation which the receiver 18 intercepts is essentially the same as the background radiation which the receiver 10 intercepts from the same location a brief instant later. Accordingly, the portions of the receiver output signals developed in response to background radiation largely cancel in the differential amplifier 28. As a result, the output signal from the differential circuit is essentially free of background radiation components.

The echo components of the output signal from the receiver 10, however, appear at the output from the differential amplifier 28 with substantial amplitude. They can then be applied to a utilization device 32 incorporating, for example, conventional display and/or threshold circuits.

FIG. 2 shows another optical receiving system employing the invention. However, whereas the system of FIG. 1 employs two optical receivers having different spatial fields of view, the system of FIG. 2 utilizes two receivers, indicated generally at 34 and 36, having identical coincident beams 38 and 40 but with different spectral fields of view. That is, the output signal from the receiver 34 is developed in response to radiation received in a frequency band different from the radiation producing the output signal from the receiver 36.

To illustrate a further feature of the invention, the embodiment shown in FIG. 2 is a passive receiving system. That is, the receiver 34 develops target signals by intercepting radiation that is either produced within the target, such as infrared radiation, or radiation incident upon the target from some other, often unknown, source and reflected in the direction of the receiving system.

More particularly, the receiver 34 of FIG. 2 is of conventional design and includes an optical bandpass filter 34$a$, an optical detector 34$b$ and a signal processor 34$c$. The signal processor converts the output signal from the detector 34$b$ to a video signal corresponding to the amplitude variations in the intercepted radiation. Likewise, the receiver 36 comprises an optical bandpass filter 36$a$, an optical detector 36$b$ and a signal processor 36$c$.

A differential amplifier 42 receives the video signals output from the receivers and its output signal is in turn applied to a conventional utilization device 44.

As noted above, the receivers 34 and 36 have different spectral fields of view, and only the receiver 34 produces target signals. For this purpose, the passband of the filter 34$a$ is coincident with the frequency band of the desired target radiation. The filter 36$a$, on the other hand, has a passband that excludes the passband of the filter 34$a$ and, in fact, is preferably chosen to minimize the possibility that the receiver 36 will respond to any radiation a target might radiate or reflect. A further consideration in selecting the filters 34$a$ and 36$a$ is the requirement that the background radiation preferably have much the same characteristics at the two passbands. Thus, the output signals from the receivers 34 and 36 contain largely the same background radiation components. However, only the receiver 34 develops signals indicating the presence of targets.

As a result, only a relatively small portion of the output signal from the differential amplifier 42 corresponds to background radiation. The target-dependent radiation which the receiver 34 intercepts, however, produces a relatively large amplitude signal at the output of the differential amplifier. The utilization device 44 responds to this relatively large signal and initiates the appropriate response.

Thus, the invention described above provides an improved optical receiving system wherein the output signals from two optical receivers having different spectral or spatial fields of view are combined. The two receivers accept substantially the same background radiation but only one responds to target-dependent radiation. As a result, the difference between the output signals of the two receivers is essentially only dependent on radiation from a target.

The invention is suited for use in both active and passive optical receiving systems and can be used in conjunction with optical receiving apparatus utilizing prior art techniques for minimizing the relative amount of background radiation present in the output signal of an optical receiver.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to be secured by Letters Patent is:

1. Optical receiving apparatus comprising in combination
   (A) a first optical receiver
      (1) having a field of view encompassing selected radiation, and
      (2) developing an output signal responsive to the optical radiation it intercepts,
   (B) a second optical receiver
      (1) having a field of view substantially excluding said selected radiation and encompassing substantially identical background radiation as said field of view of said first receiver, and
(2) developing an output signal responsive to the optical radiation it intercepts, and
(C) means connected with said first and second receivers and producing an output signal responsive to the amplitude difference between the output signals from said receivers.

2. The combination comprising
(A) first and second optical receivers,
(1) each receiver having a spatial field of view,
(2) said fields of view being separated in space by an angle measured along a first axis,
(3) each receiver producing an output signal responsive to the optical radiation it intercepts,
(B) scan means moving said fields of view along said first axis with the field of view of said second receiver leading the other field of view,
(C) signal comparing means in circuit with each of said receivers and receiving the output signals therefrom,
(1) said comparing means developing an output signal responsive to the difference between the amplitudes of the output signals from said receivers, and
(D) delay means in series between said second receiver and said comparing means,
(1) said delay means delaying the output signal from said second receiver by an interval equal to the interval between the time the field of view of said second receiver includes a location in space to the time the field of view of said first receiver includes the same location in space.

3. Apparatus according to claim 2
(A) further comprsing an optical transmitter,
(B) in which only one of said receivers is so arranged that its field of view intercepts echoes of energy transmitted by said transmitter.

4. Optical receiving apparatus comprising in combination
(A) an optical transmitter selectively operable to transmit optical energy into a location in space,
(B) optical receiving means
(1) developing a first video signal in response to first radiation intercepted from a location in space immediately prior to arrival at said location of energy from said transmitter,
(2) developing a second video signal in response to second radiation intercepted from said same space location,
(a) said second radiation including echoes of energy from said transmitter, and
(C) means comparing said first and second video signals and developing an output signal corresponding to the differences between them.

5. Apparatus according to claim 4 further comprising means for sweeping said transmitter and said receiver means in synchronism with each other and at the same rate.

6. Optical receiving apparatus comprising in combination
(A) an optical transmitter for transmitting a beam of optical energy,
(B) a first optical receiver
(1) having a spatial field of view oriented to intercept reflections of the transmitter energy, and
(2) developing a video output signal corresponding to the amplitude variations in the optical energy it intercepts,
(C) a second optical receiver
(1) having a spatial field of view
(a) identical to the field of view of said first receiver,
(b) slightly offset along a first axis from the orientation of said first receiver field of view, and
(c) intercepting substantially no reflections of the transmitter energy,
(2) developing a video ouput signal corresponding to the amplitude variations in the optical radiation it intercepts,
(D) scanning means connected with said transmitter and with said first and second receivers to sweep their spatial fields of view in synchronism and at the same rate along said first axis with the field of view of said second receiver leading the field of view of said first receiver,
(E) delay means connected with said second receiver and delaying the video output signal therefrom by an amount equal to the interval between the times when the fields of view of said receivers include the same location in space during the same scan,
(F) a differential amplifier connected with said first receiver and with said delay means to receive the output signal from said first receiver and the delayed output signal from said second receiver,
(1) said differential amplifier developing an output signal corresponding to the difference between the amplitudes of the signals it receives, and
(G) signal utilization means connected with said differential amplifier to receive the output signal therefrom.

7. Optical receiving apparatus comprising in combination
(A) a first optical receiver
(1) having a spectral field of view including a selected frequency range, and
(2) producing an output signal responsive to the optical radiation it intercepts,
(B) a second optical receiver
(1) having the same spatial field of view as said first receiver, and
(2) having a spectral field of view
(a) excluding said selected frequency range, and
(b) embracing substantially similar background radiation to that of said spatial field of view of said first receiver, and
(3) producing an output signal responsive to the optical radiation it intercepts,
(C) means connected with said first and second receivers and producing an output signal responsive to the instantaneous difference between the output signals from said receivers.

8. Apparatus according to claim 7 in which each of said receivers comprises
(A) an optical filter receiving intercepted radiation,
(B) an optical detector optically coupled with said filter and receiving the optical radiation output therefrom, and
(C) signal processing means coupled with said optical detector and producing a video output signal corresponding to the variations of the radiation incident upon said filter.

9. Apparatus according to claim 8 in which said optical filter in said first receiver has a passband wholly outside the passband of said optical filter in said second receiver.

10. Apparatus according to claim 7 in which said first and second receivers are arranged with coincident spatial fields of view.

11. Optical receiving apparatus comprising in combination
(A) optical receiving means
(1) developing a first video signal in response to intercepted radiation within a first frequency range, (2) developing a second video signal in response to intercepted radiation within a second frequency range,
  (a) said second frequency range being outside said first frequency range, and embracing substantially similar background radiation,
(3) said first and second signals being developed in response to radiation intercepted at the same time and from the same space location, and
(B) means comparing said first and second video signals and producing an output signal corresponding to the instantaneous differences between them.

References Cited

UNITED STATES PATENTS

| | | | |
|---|---|---|---|
| 2,837,738 | 6/1958 | Van Valkenburgh | 250—83.3 |
| 2,927,212 | 3/1960 | Shimukonis et al. | 250—83.3 |
| 2,999,152 | 9/1961 | Gallagher et al. | 250—83.3 X |
| 2,999,161 | 9/1961 | Lovoff | 250—83.3 |
| 3,010,102 | 11/1961 | Kecthledge et al. | 250—83.5 X |
| 3,044,297 | 7/1962 | Hanken | 250—83.3 X |
| 3,204,100 | 8/1965 | Wormser et al. | 250—83.3 |
| 3,287,556 | 11/1966 | Good | 250—83.3 X |
| 2,972,924 | 2/1961 | Clemens | 88—1 |

JAMES W. LAWRENCE, *Primary Examiner.*

C. R. CAMPBELL, *Assistant Examiner.*

U.S. Cl. X.R.

88—1; 250—209, 210, 833